June 10, 1952 C. P. STARFIELD 2,599,875
ARMATURE WINDING MACHINE
Filed Feb. 7, 1947 6 Sheets-Sheet 1
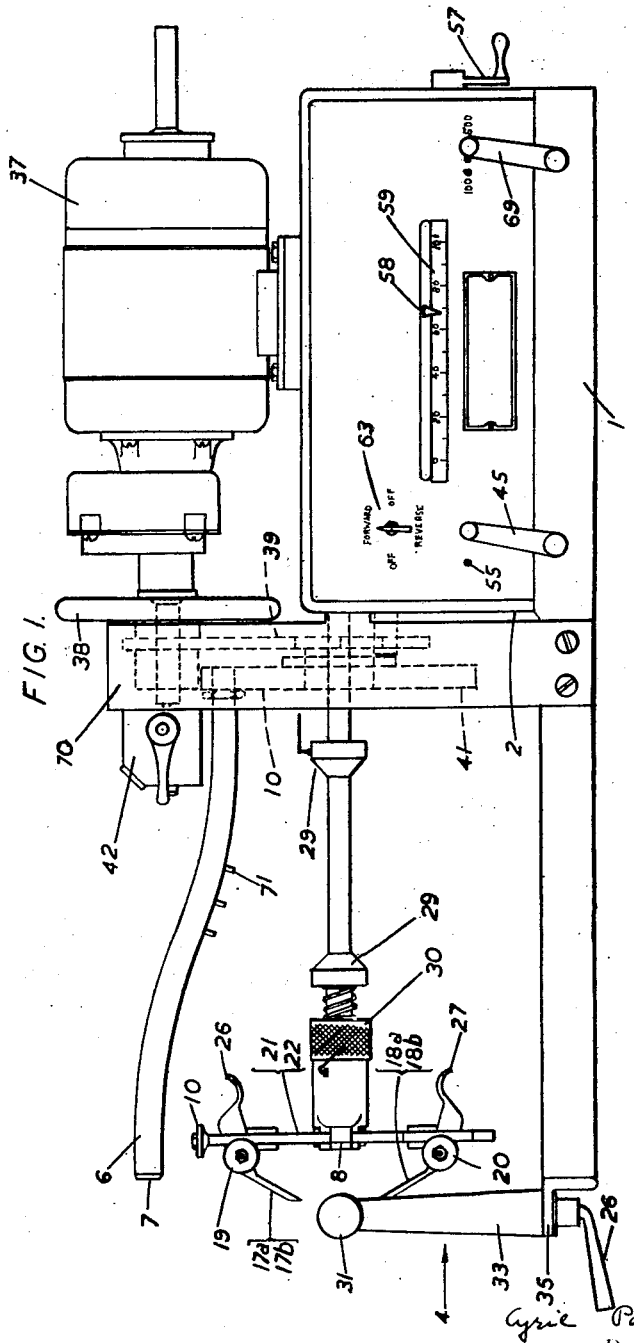
Inventor
Cyril Peter Starfield
By
[signature]
Agt.

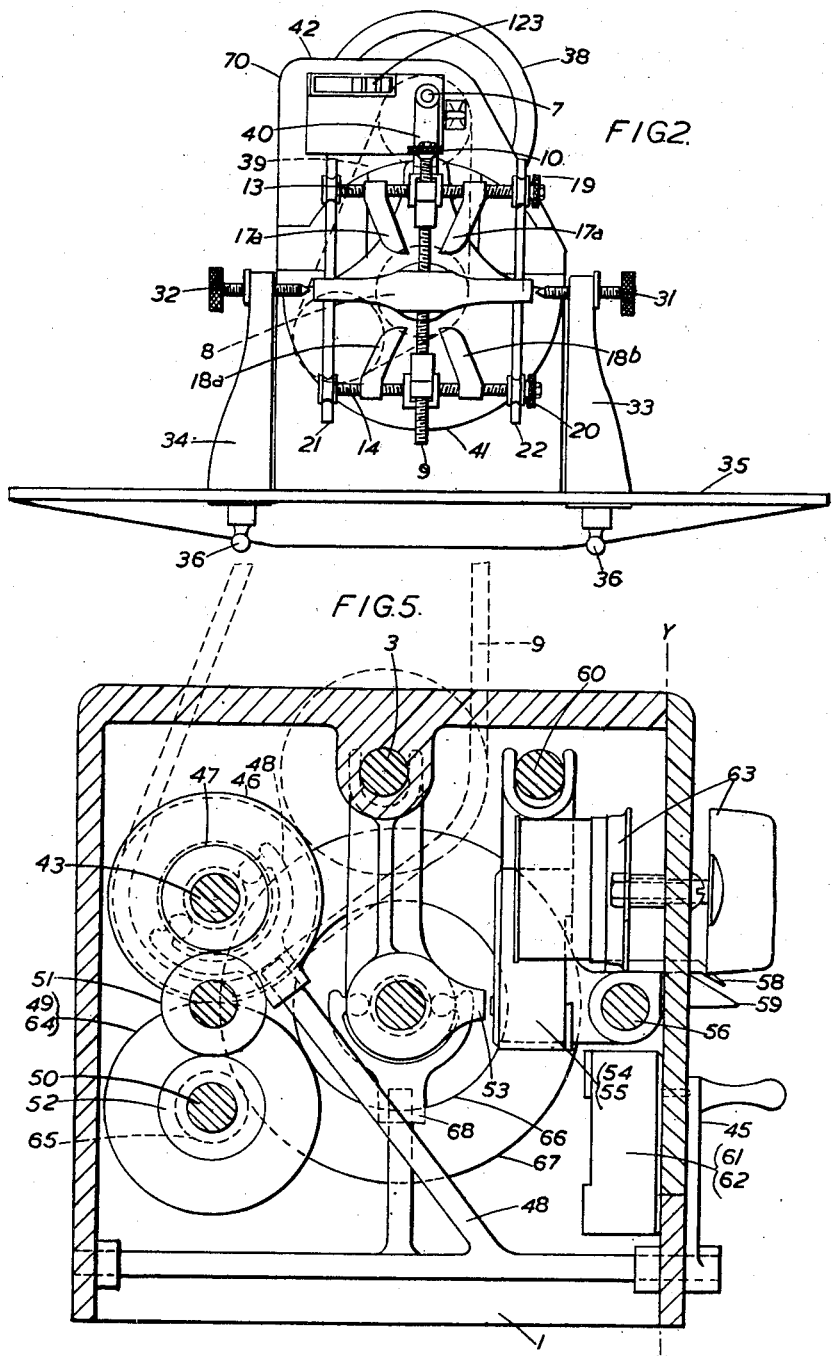

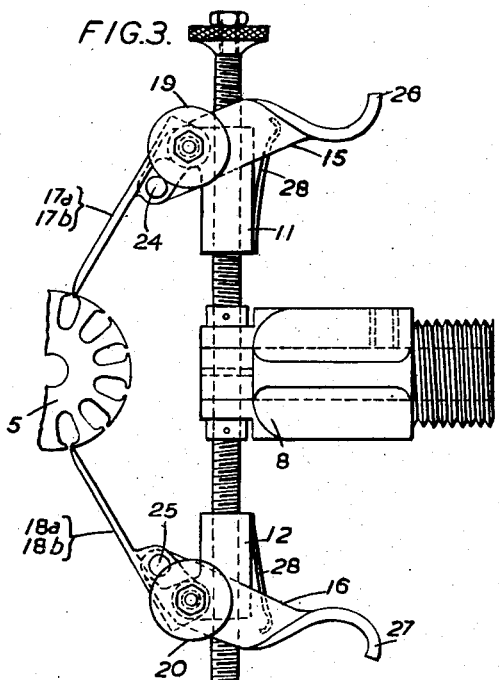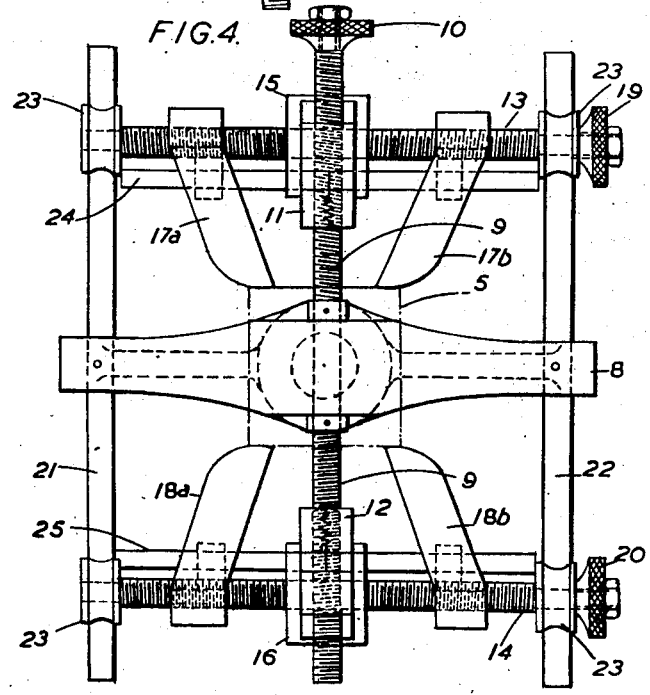

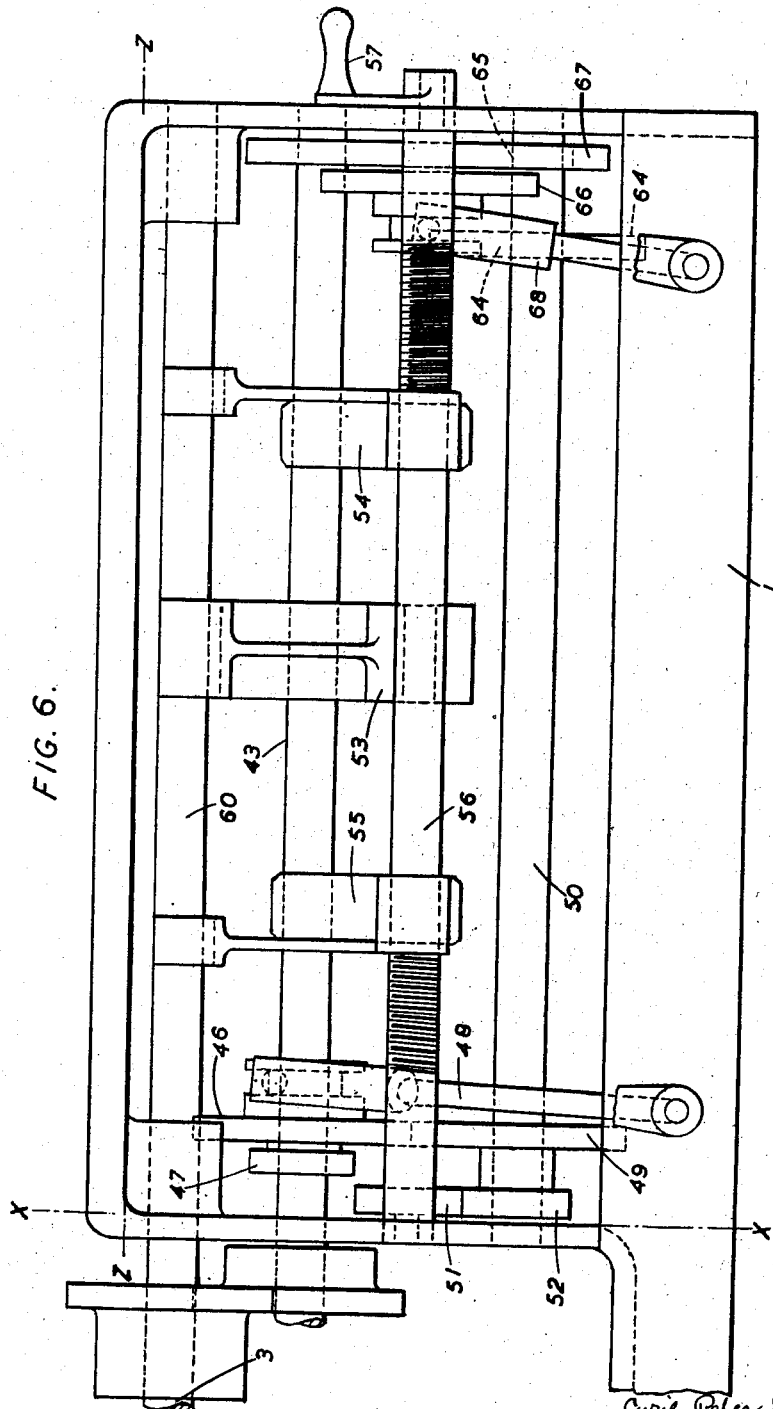

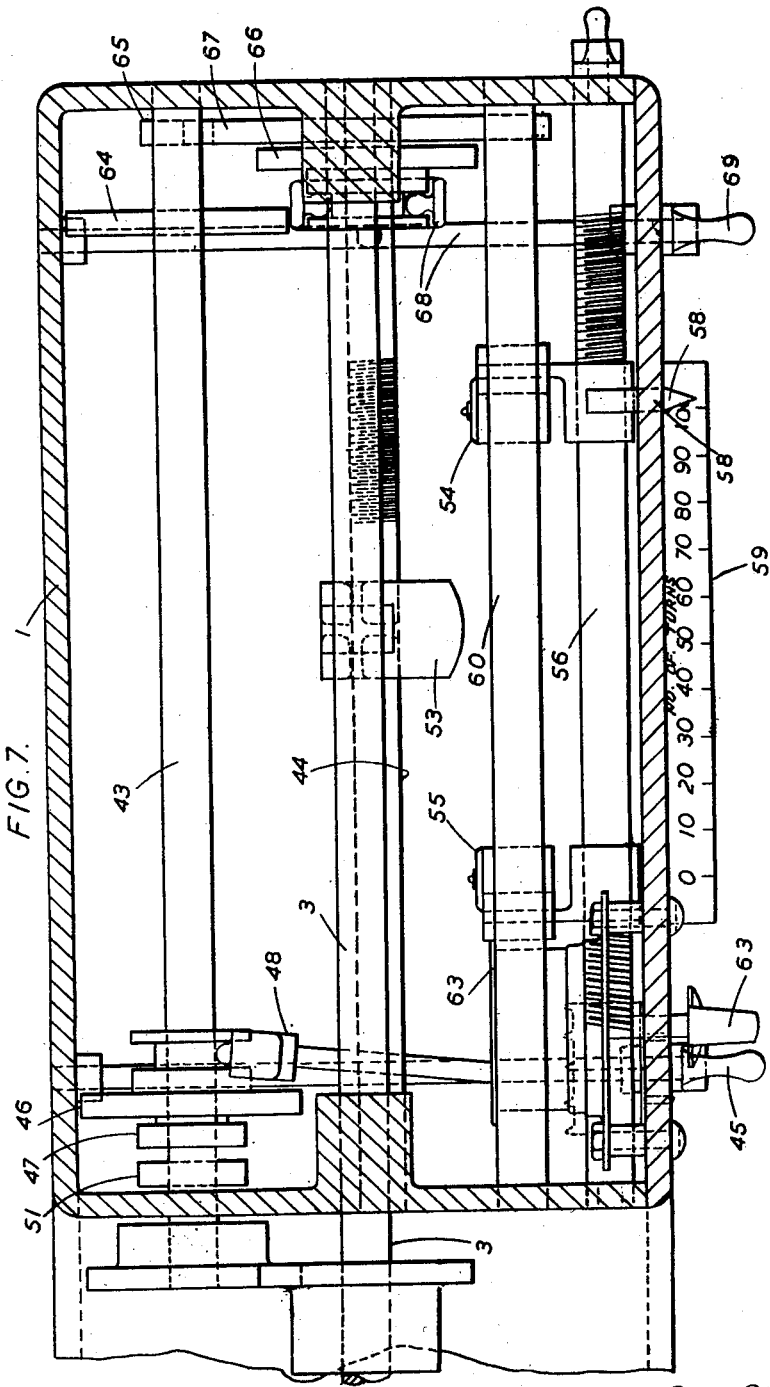

June 10, 1952 — C. P. STARFIELD — 2,599,875

ARMATURE WINDING MACHINE

Filed Feb. 7, 1947 — 6 Sheets-Sheet 6

Inventor
Cyril Peter Starfield
By

Patented June 10, 1952

2,599,875

UNITED STATES PATENT OFFICE 2,599,875

ARMATURE WINDING MACHINE

Cyril Peter Starfield, Dukinfield, England, assignor to The Midland Dynamo Company Limited, Leicester, England Application February 7, 1947, Serial No. 727,103
In Great Britain January 17, 1946

Section 1, Public Law 690, August 8, 1946
Patent expires January 17, 1966

7 Claims. (Cl. 242—13)

This invention concerns an armature winding machine and one of its objects is the provision of a machine which may be used for winding the armatures of small electric motors, such for example as those employed in vacuum cleaners and other portable industrial and domestic appliances.

The invention provides an armature winding machine of the type in which the armature and a wire-feeder revolve relatively about an axis substantially normal to that of the armature, having at least two opposed inclined guides for guiding the wire into the armature slots, and means for adjusting the spacing between said guides to accommodate armatures of differing diameters.

According to an important feature of the invention, there is a pair of spaced guides at each side of the armature, and means for adjusting the spacing of said guides to accommodate armatures of different lengths. It is intended that the guides shall be so set as to incline into two armature slots, which in general will be nearly at diametrically opposed locations on the armature, so that during relative rotation between the armature and the wire-feeder the wire is laid on the inclined surfaces of the guides and slides down them into slots, the coils being thus wound into the slots. After the requisite number of turns have been wound in one pair of slots it is necessary to adjust the armature about its axis to present the next pair of slots for winding. This adjustment of the armature is facilitated if manually operable means is provided whereby the guides on opposed sides of the armature may be moved apart without interfering with their setting; for example, the guides may be pivoted and provided with finger pieces by means of which they may be pivoted or swung fully open or apart against the action of springs.

An important subsidiary feature of the invention resides in pre-set counting mechanism for interrupting the drive of the winding machine after a pre-determined number of turns have been wound.

The foregoing and other features of the invention set out in the appended claims are incorporated in the construction of armature winding machine which will now be described as an example with reference to the accompanying drawings in which Figure 1 is a side elevation and Figure 2 a front elevation of that machine;

Figure 3 is a side elevation and Figure 4 a front elevation (both on a larger scale) of the guide head shown in Figs. 1 and 2 and hereinafter described;

Figure 5 is a cross section through the base or pedestal of the machine, taken on the line X—X in Fig. 6 and showing certain gearing;

Figure 6 is a longitudinal section taken on the line Y—Y in Fig. 5;

Figure 7 is a sectional plan taken on the line Z—Z in Fig. 6;

Figure 8:
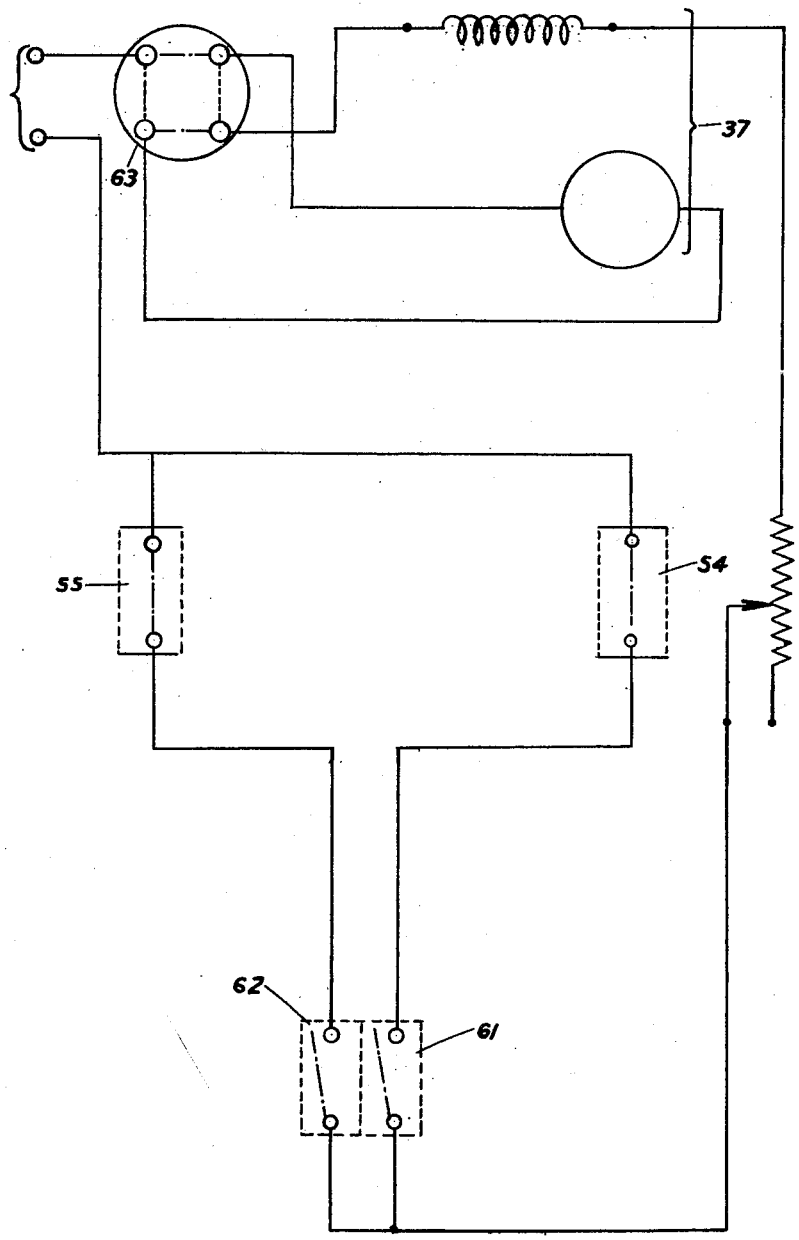
Figure 8 is a circuit diagram.

This machine comprises a base or pedestal 1 having an upright portion 2 from which a stationary spindle 3 protrudes horizontally; means 4 are provided for mounting an armature 5 (Fig. 3) near the free end of the spindle 3 for rotational adjustment about a horizontal axis which is normal to that of the spindle. The spindle 3 receives the bobbin or like supply of wire and also carries a rotatable arm or flyer 6, (driven in the manner hereinafter described) having a wire-guiding eye 7 at its outer end and a further eye or eyes 7' approximately midway along the flyer 6. The wire from the bobbin is fed through these eyes and, its end being secured to the armature, as the flyer rotates coils of wire are laid in slots in the armature positioned to receive them.

At the free end of the spindle 3, the guide head is secured. This head consists of a carrier 8 removably screwed to this end of the spindle 3 and transfixed by a vertical main adjustment screw 9 having right and left hand threads and a knurled knob or the like 10 on its upper end by which it may be rotated. The upper and lower part of this screw each carries an adjusting nut or sleeve 11 or 12 in screwed engagement with it and each sleeve is also rotatably transfixed by a cross screw, being a horizontal adjustment screw 13 or 14 (with right and left hand thread) which serves to hinge a bracket 15 or 16 to it. At each side of its bracket 15 or 16, each horizontal screw 13 or 14 extends through the boss of an inclined guide finger 17a, 17b, and 18a, 18b. Therefore by rotating the vertical screw 9 the vertical spacing between the upper and lower pairs of guide fingers (17a, 17b and 18a, 18b) may be adjusted while by rotating the horizontal screw 13, 14 (provided with knurled knobs or the like 19, 20) the spacing between the guide fingers of either pair may also be adjusted. These guide fingers extend forwardly and outwardly from their mountings so as to provide guide ramps leading to the armature slots, their free ends being intended to rest on the edges of the slots. As a result, as the flyer 6 rotates, it lays wire on the guides 17a, 17b, 18a, 18b, and the wire slips down the latter into the slots as before described.

In order to impart rigidity to the structure thus described, the carrier 8 has two horizontal arms in the ends of which vertical rods 21, 22 are fixed so that these two rods are parallel with and one on either side of the vertical screw 9. Rollers 23 or the ends of the horizontal screws 13, 14 run on these rods.

Furthermore, each pivoted bracket 15 or 16 is transfixed by a horizontal guide rod 24 or 25 which transfixes the bosses of the associated pair of guide fingers 17a, 17b, or 18a, 18b, so that the latter slide along the rod. In order that the upper and lower pairs of guide fingers may be lifted or swung apart to permit of rotational adjustment of the armature, each bracket 15 or 16 is provided with a rearwardly protruding finger piece 26 or 27 whereby when the finger pieces are squeezed the brackets 15, 16 pivot on their respective screws 13, 14 and carry the guide rods 24, 25 with them. This movement of the guide rods in turn causes the upper guide fingers 17a, 17b to swing up about screw 13 and the lower guide fingers 18a, 18b to swing down about screw 14. Leaf springs 28 are provided which engage the fingers 26, 27 and urge the upper and lower pairs of guides towards one another about the screws 13, 14.

This guide head is removable from the horizontal spindle 3 in order to permit the bobbin of wire to be slipped onto the latter. The bobbin is gripped frictionally in order to tension the wire, this grip being adjustable; for example, it may be gripped between spring-pressed cones 29, means 30 being provided for adjusting its spring pressure.

The means 4 for mounting the armature 5 consists of horizontal centres 31, 32 adjustable by means of screw threads in uprights 33, 34 that are mounted on a cross member 35 so as to be adjustable along it for spacing and are provided with securing means 36.

On the base or pedestal 1 of the machine is mounted an electric motor 37 driving the flyer 6, preferably through a hand wheel and a chain-and-sprocket drive 39. The flyer 6 is carried by an arm 40 rotatably mounted on spindle 3 and provided with a balance weight 41. A revolution counter 42 is mounted on the chain case 70 and is directly driven by the motor shaft.

The chain-and-sprocket drive 39 also serves to drive a shaft 43 which in turn drives a lead screw 44 through reversing gearing operable by a reversing lever 45. This reversing gearing comprises two pinions 46, 47 slidably secured on shaft 43 and movable along it by means of a gear-shifter 48 operated by lever 45, between a position in which pinion 46 meshes with a gear 49 on a lay-shaft 50 and a position in which a pinion 47 meshes with an idler 51 which in turn meshes with gear 52 on said lay-shaft. The manner in which lay-shaft 50 drives lead-screw 44 is described later.

The lead screw 44 has a switching member 53 mounted on it so as to be traversed by it. This switching member is prevented from rotating by sliding engagement with spindle 3 and moves between two limit switches 54, 55, so that when it makes contact with and operates either switch, the motor 37 is brought to a standstill. The spacing between these limit switches is adjustable so that the winder may be set to apply a predetermined number of turns of wire and then to come to a standstill. For this purpose, the switches are, or at least one of them is, mounted on an adjusting screw 56 rotatable by crank 57 so that their spacing may be adjusted in conformity with the number of turns of wire required and associated with this adjusting mechanism there is an index finger 58 (on one limit switch), movable over a visible scale 59. The limit switches are restrained from rotation by sliding engagement with guide rod 60.

It may here be remarked that the limit switches 54, 55 are normally closed and are in circuit with reversing switches 61, 62 that are normally open but are operated by reversing lever 45. When the latter is moved to either of its two positions it closes the appropriate reversing switch and thereby makes the circuit through the associated limit switch so that the motor runs in the direction determined by a control switch 63. The switching member 53 is thereupon traversed by lead screw 44 until it operates said associated limit switch to break the circuit, whereupon the motor comes to a standstill until the reversing lever is shifted to close the other reversing switch and to operate the reversing gearing.

Switches 54, 55, 61, 62 are of the snap action variety movable by plungers.

Control switch 63 is not only an on-off or stop-start switch, but is also a reversing switch whereby the motor 37 may be caused to rotate in either direction to apply right or left hand windings to the armature 5.

The motor-driven lead screw 44 is driven through the reversing gear because after one winding operation in which the switch-operating member 53 is carried by the lead screw into contact with one limit switch, it is desirable to reverse the lead screw so that in the next winding operation said operating member is traversed in the reverse direction into contact with the other limit switch. It is further desirable to provide change-speed gearing between the motor 37 and the lead screw 44 so that gear changes may be made to alter the ratio between the motor and lead screw, whereby a revolution of the lead screw may correspond, according to the ratio, with the application of a different number of turns. For this purpose the lay-shaft carries unequal gears 64, 65, while slidably fixed to the lead-screw there is a unit consisting of a small gear 66 and a large gear 67. This unit may be moved by a gear shifter 68 operated by a gear lever 69 between the position shown, in which gear 67 meshes with gear 65, and a position in which gear 66 meshes with gear 64.

I claim:

1. In an armature winding machine of the type in which the armature and a wire-feeder revolve relatively about an axis substantially normal to that of the armature, a guide head comprising in combination, a carrier, a manually rotatable main adjustment screw rotatably mounted on said carrier with said screw ends protruding and having a right hand thread on one end and a left hand thread on the other, a nut carried by each said end for adjustment of the spacing between the two nuts by rotation of the main screw, a manually-rotatable cross screw rotatably carried by each nut, each of which cross screws has protruding ends having a right hand thread on one end and a left hand thread on the other and said cross screws extending parallel to each other and being adjustable towards and away from one another by the aforementioned rotation of the main screw, a pair of inclined guides, one on each threaded end of one cross screw, for guiding the wire into a slot at one side of the armature, and an opposed pair of inclined guides, one on each threaded end of the other cross screw, for guiding the wire into a slot at the opposite side of the armature, which two pairs of guides are movable towards and away from each other by rotation of the main screw to adapt the head to armatures of different diameters and the guides of each pair being adjustable by rotation of their cross screws to adapt the head to armatures of differing lengths.

2. A machine according to claim 1, having two guide rods on the carrier one on each side of and parallel with the main screw, and having means on the ends of the cross screws for engaging said guide rods.

3. In an armature winding machine of the type in which the armature and a wire-feeder revolve relatively about an axis substantially normal to that of the armature, a guide head comprising a pair of inclined guides for guiding the wire into a slot at one side of the armature, an opposed pair of inclined guides for guiding the wire into a slot at the opposite side of the armature, each of which pair of guides has inner extremities for location in proximity to the armature slot and outer inclined faces for leading towards said slot, a carrier, a manually-rotatable main screw rotatably carried by it and having protruding ends formed respectively with right and left hand threads, a nut on each said end, a manually rotatable cross screw carried by each nut at right angles to the main screw and having protruding ends formed respectively with right and left hand threads, whereof the ends of one cross screw are respectively in screw threaded engagement with the two guides of one pair and the ends of the other cross screw are respectively in screw threaded engagement with the guides of the other pair, the spacing between the two pairs of guides being adjustable by rotation of the main screw to adapt the head to armatures of differing diameters and the two guides of each pair being movable towards and away from each other by rotation of their cross screw to adapt them to armatures of differing lengths, and means for preventing rotation of the guides about the cross screws.

4. A machine according to claim 3, wherein said means consists of cross guide rods extending parallel with the cross screws and slidably transfixing parts associated with the guides.

5. A machine according to claim 3, wherein said means for preventing rotation of the guides comprises brackets pivoted to the nuts for movement about the cross screw axes, cross guide rods carried by the brackets in parallel relation to the cross screws, parts associated with the guides and slidably transfixed by the guide rods, and spring means opposing movement of said brackets, guide rods, guides, and brackets, about the cross screws when the latter are rotated, which machine is further provided with finger pieces on the brackets for swinging the brackets, guide rods, guides and brackets about the cross screws and for thereby moving the two pairs of guides apart manually.

6. In an armature winding machine of the type in which the armature and a wire-feeder revolve relatively about an axis substantially normal to that of the armature, having a pair of inclined guides for guiding the wire into a slot at one side of the armature and an opposed pair of guides for guiding the wire into a slot at the other side of the armature, which pairs of guides converge towards the armature axis and present outer inclined faces across which the wire is laid in the aforesaid rotation and down which it slips into the slots, a single manually-operable setting device for adjusting the two pairs towards and away from one another to adapt them to armatures of differing diameters, manually operable means for adjusting the guides of each pair towards and away from one another to adapt them to armatures of differing lengths and manually-operable means for temporarily moving the two pairs of guides apart from their setting as determined by the setting device to permit the armature being rotated.

7. An armature winding machine, comprising a mounting for a wound supply of wire, means for mounting a slotted armature to be wound with its axis substantially normal to the axis of the wound supply, a wire-feeder rotatable concentrically about the supply to wind wire therefrom into the armature slots and having a final wire guide from which the wire travels inwards to the armature, and a guide head having a stationary location inside the path of the feeder and between the supply and the armature, which head comprises a pair of inclined guides having inner extremities for location at a slot at one side of the armature and having inclined outer faces, substantially tangential to a circle concentric with the armature axis, for receiving the wire travelling inwards from the rotating wire guide and for guiding it into the slot, a pair of opposed inclined guides having inner extremities for location at a slot at the other side of the armature and having inclined outer faces, substantially tangential to a circle concentric with the armature axis, for receiving the wire travelling inwards from the rotating wire guide and for guiding it into the last said slot, a single manually operable setting device for adjusting the two pairs of inclined guides towards and away from one another to adapt the head to armatures of differing diameters, and manually operable means for adjusting the two guides of each pair towards and away from one another to adapt the head to armatures of differing lengths.

CYRIL PETER STARFIELD.

REFERENCES CITED

The following references are of record in the file of this patent:

UNITED STATES PATENTS

| Number | Name | Date |
|---|---|---|
| 598,273 | Oehring | Feb. 1, 1898 |
| 1,121,798 | Chapman | Dec. 22, 1914 |
| 1,307,620 | Crane | June 24, 1919 |
| 1,353,269 | Rhoades | Sept. 21, 1920 |
| 1,635,677 | Jones et al. | July 12, 1927 |
| 1,865,461 | Emmert | July 5, 1932 |
| 2,007,830 | McNeill | July 9, 1935 |

FOREIGN PATENTS

| Number | Country | Date |
|---|---|---|
| 581,873 | France | Oct. 4, 1924 |